Sept. 3, 1968 R. E. ENSTROM ET AL 3,400,016

METHOD OF COATING SUPERCONDUCTING NIOBIUM TIN WITH LATTICE DEFECTS

Filed Nov. 15, 1965 2 Sheets-Sheet 1

INVENTORS
RONALD E. ENSTROM
JOSEPH J. HANAK
KURT STRATER
FREDERICK R. NYMAN

BY Glenn H. Bruestle

ATTORNEY

INVENTORS
RONALD E. ENSTROM
JOSEPH J. HANAK
KURT STRATER
FREDERICK R. NYMAN

BY Glenn H. Bruestle
ATTORNEY

United States Patent Office 3,400,016

Patented Sept. 3, 1968

3,400,016

METHOD OF COATING SUPERCONDUCTING NIOBIUM TIN WITH LATTICE DEFECTS

Ronald E. Enstrom, Skillman, Joseph J. Hanak, Trenton, Kurt Strater, Brookside, and Frederick R. Nyman, Somerville, N.J., assignors to Radio Corporation of America, a corporation of Delaware Filed Nov. 15, 1965, Ser. No. 507,923
9 Claims. (Cl. 117—227)

This invention relates to improved methods of making improved superconducting material, and more particularly to improved methods of making improved superconducting niobium tin coatings on various substrates.

Superconducting materials are classified as type I, also known as "soft" superconductors, and type II, also known as "hard" superconductors.

Superconducting materials of type II have been utilized to fabricate electromagnets which develop strong magnetic fields at low temperatures while dissipating very little power, as described by T. G. Berlincourt, "High Magnetic Fields by Means of Superconductors," British Journal Applied Physics, volume 14, p. 749, 1963. Two important parameters of a type II or "hard" superconducting material are the characteristic temperature at and above which it ceases to be superconducting, known as the critical temperature $T_C$, and characteristic magnetic field at and above which it ceases to be superconducting, known as the upper critical magnetic field $H_{C2}$. For each superconducting material there is, at a given temperature, a critical current $I_C$, which is the largest electrical current that the material can carry in a given external magnetic field.

It is desirable that the three parameters, viz $T_C$, $H_{C2}$, and $I_C$ be as high as possible. The superconductor with the highest critical temperature $T_C$ presently available is the material niobium tin or niobium stannide, which preferably corresponds to the composition $Nb_3Sn$. Niobium tin also has a high upper critical magnetic field $H_{C2}$. For a detailed discussion of niobium tin and its properties, see the September 1964 issue of RCA Review.

Niobium tin has been synthesized by running molten tin over powdered niobium in a sealed quartz tube maintained at 1200° C. Alternatively, granulated niobium and tin can be mixed in appropriate proportions and sintered in a furnace boat. However, the material ordinarily made by direct synthesis of the elements tends to be porous, chalky and brittle. It does not have a metallic appearance or luster. The quality of the prior art material is poor, as shown by the fact that the density of the prior art material is considerably below the theoretical maximum density calculated for niobium stannide having a perfect crystal lattice structure. It is very difficult to use such brittle materials for the fabrication of superconducting devices. Superconducting magnets have been made by filling a metal tube with powdered niobium and powdered tin, winding the tube into a coil, and heating the coiled tube to sinter the powdered core into a compact mass of $Nb_3Sn$. Alternatively, magnets have been made by winding tin-coated niobium wire into a coil, and then heating the coil to form a thin niobium tin coating over the niobium wire. These methods have several drawbacks. They are slow and cumbersome. Furthermore, the finished coil is brittle, and cannot be unwound without breaking.

An improved vapor-phase method of preparing superconducting niobium stannide coatings on substrates has been developed, comprising the simultaneous reduction by hydrogen of the gaseous chlorides of niobium and tin at temperatures of about 900° to 1200° C. to deposit niobium stannide on the surface of solid substrates. According to one embodiment, chlorine gas is passed over sintered niobium stannide to form the mixture of gaseous chlorides, and hydrogen is then added to the mixture. Visibly crystalline $Nb_3Sn$ deposits having a metallic luster and a density greater than 95% of the theoretical maximum density of $Nb_3Sn$ have thus been prepared. For details, see J. J. Hanak "Vapor Phase Deposition of $Nb_3Sn$," Metallurgy of Advanced Electronic Materials, Interscience Publishers, New York, 1963, pp. 161–171. Superconducting materials thus prepared are capable of carrying high currents at high magnetic fields, and have been utilized to fabricate a superconducting magnet which produces a magnetic field of over 100,000 gauss. See, for example, E. R. Schrader et al., "High Field $Nb_3Sn$ Superconducting Magnets by Magnetic Field Stabilization," Applied Physics Letters, volume 4, page 105, Mar. 15, 1964. Although excellent results have thus been obtained, the current carrying capacity $I_C$ of the material at high magnetic fields is not as great as theory indicates it could be. Improvement is desirable in the current carrying capacity $I_C$ of the superconducting material for a given magnetic field. Improvement is also desirable in the uniformity of the superconducting material produced.

Accordingly, the objects of this invention are to provide improved methods of fabricating improved superconducting material; to provide improved methods of depositing uniform $Nb_3Sn$ coatings on substrates; and to provide improved methods of depositing niobium stannide coatings which have high current carrying capacity at high magnetic fields.

These and other objects are attained by an improved method of depositing a dense crystalline coating of superconductive niobium stannide on a substrate, comprising treating the substrate in an ambient consisting essentially of a mixture of hydrogen, the mixed vapors of niobium chloride and tin chloride, and a lattice defect inducing gas. The ambient utilized may also include chlorine and hydrogen chloride. The lattice defect inducing gas is preferably a gas such as carbon monoxide, carbon dioxide, hydrocarbons having a molecular weight greater than 16, nitrogen, or the like, which is capable of inducing defects in the crystal structure of the deposited niobium stannide. The niobium stannide coated material thus prepared exhibits a higher current capacity $I_C$ at higher magnetic fields than the prior art materials.

The invention will be described in greater detail by the following examples, considered in conjunction with the accompanying drawing, in which.

Figure 3:
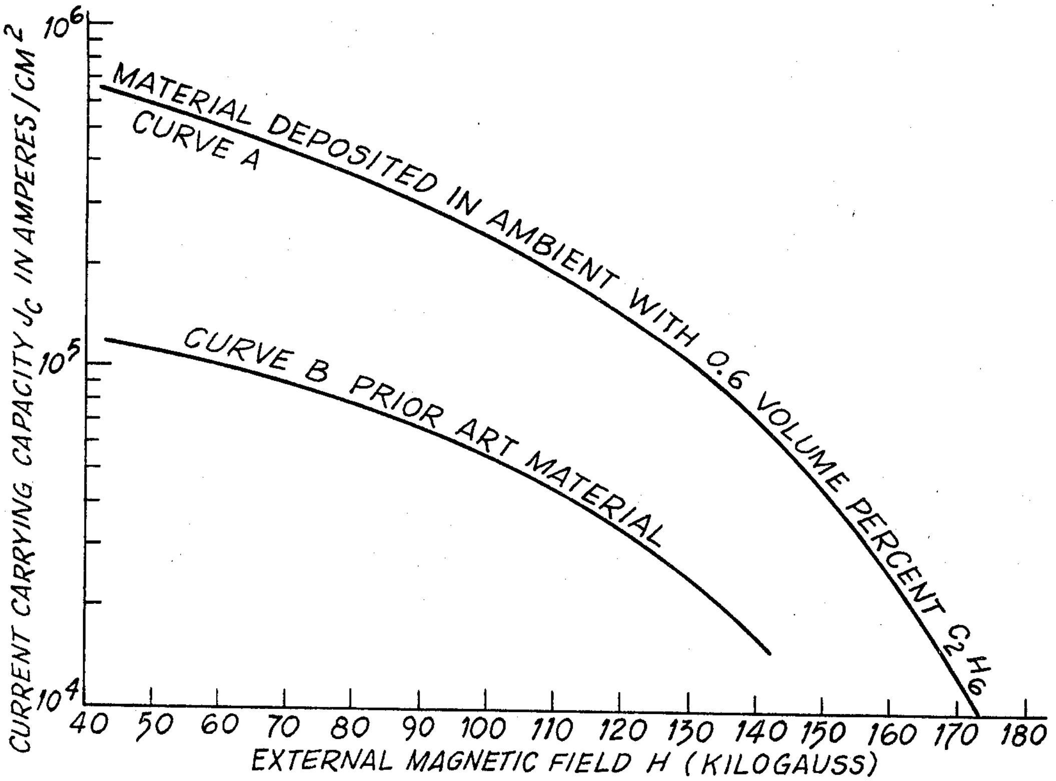
Figure 4:
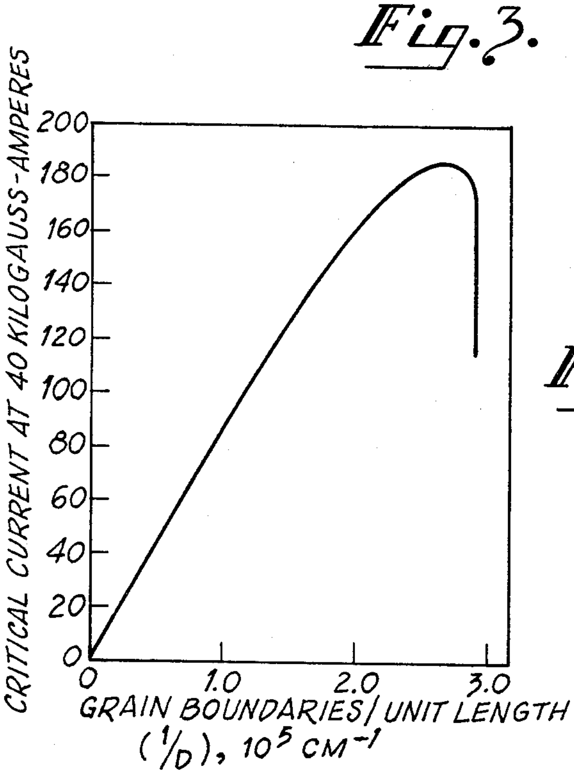

FIGURE 3 is a plot of the current carrying capacity at different external magnetic fields for superconductive material according to one embodiment, with a similar plot of prior art material for comparison; and, FIGURE 4 is a plot of the variation of the critical current of a superconductive niobium tin coating in a 40 kilogauss magnetic field versus the inverse of the average grain size of the coatings.

EXAMPLE I

In this embodiment, the apparatus utilized comprises a refractory furnace tube or reaction chamber 10 (FIGURE 1) having an inlet 11 at one end and an outlet 12 at the opposite end. The central portion of furnace tube 10 is surrounded by a furnace heater 13, which may suitably be of the electrical resistance type.

A single substrate may be coated, or a plurality of substrates may be simultaneously coated with $Nb_3Sn$. The latter practice is advantageous when it is desired that the niobium stannide coating on a plurality of substrates be of uniform thickness. The substrates utilized may be an insulator such as a ceramic, or a metallic object, or a semiconductor. In this example, the substrates are a plurality of semiconductive silicon bodies 14 which are positioned in furnace tube 10 adjacent the outlet 12.

Furnace tube 10 is first purged by flowing an inert gas such as helium or argon through the tube in the direction indicated by the arrows. In this example, heater 13 is set to maintain a temperature of about 900° C. to 1100° C. The flow of inert gas is ended, and a mixture of hydrogen, niobium chloride vapors $NbCl_4$, tin chloride vapors $SnCl_2$, and a lattice defect inducing gas is then passed through furnace tube 10 in the direction indicated by the arrows, so that the mixture flows over the substrates 14.

The lattice defect inducing gas utilized is one which is capable of inducing defects in the crystal structure of vapor-phase deposited niobium tin. Examples of gases useful for this purpose are carbon monoxide, carbon dioxide, nitrogen, and hydrocarbons having a molecular weight greater than 16, e.g., ethane and propane. In this example, the lattice defect inducing gas is carbon monoxide. The precise concentration of the lattice defect inducing gas is not critical, since there is a range of concentrations which may be used for each gas. This suitable concentration range varies for the different lattice defect inducing gases, but is preferably about 0.002 to 0.25 volume percent for carbon monoxide and carbon dioxide. In this example, the concentration of the carbon monoxide is about 0.03 volume percent.

The reaction which takes place within the portion of furnace tube 10 surrounded by heater 13 may be represented by the equation:

$$3NbCl_4+SnCl_2+7H_2 \rightarrow Nb_3Sn+14HCl$$

A high density visibly crystalline $Nb_3Sn$ coating 15 is deposited on the substrates 14.

While the lattice defect inducing gas does not enter into the reaction which results in the deposition of a niobium stannide coating, it may be physically incorporated within said coating, thereby disturbing the lattice constant of the coating, and producing a large number of crystal lattice defects per unit volume of the niobium stannide coating. As discussed below, the lattice defects cause an increase in the critical current $I_C$ of the niobium stannide coating.

EXAMPLE II

In the previous example, the substrate utilized was a semiconductor. In this example, the substrate utilized is an insulator.

Figure 1:
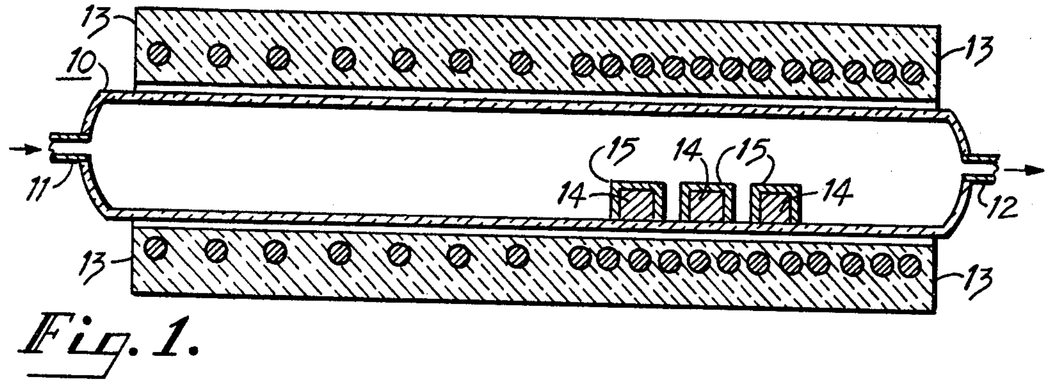
FIGURE 1 is a diagram of apparatus useful in one embodiment of the invention.

The apparatus employed may be that illustrated in FIGURE 1 and described above. The steps of positioning the furnace tube 10 in a heater 13 and positioning a plurality of substrates 14 adjacent the outlet end 12 of furnace tube 10, are similar to those described above in connection with Example I. In this example, the substrate 14 is an insulator, and consists of ceramic bodies. Steatite is a suitable ceramic for this purpose.

The furnace tube 10 is purged with an inert gas as in the previous example, and heater 13 is set to maintain temperatures of about 900 to 1100° C. The flow of inert gas is ended, and a mixture of hydrogen gas, niobium chloride vapors, tin chloride vapors, and a lattice defect inducing gas is passed through furnace tube 10 so that the mixture flows over the substrate 14. In this example, the lattice defect inducing gas consists of carbon dioxide, and its concentration in the mixed gas is about 0.03 volume percent, but may range from 0.002 to 0.25 volume percent.

As in the previous example, a high density visibly crystalline $Nb_3Sn$ coating 15 with a large number of crystal lattice defects per unit volume is deposited on the substrates 14.

EXAMPLE III

In the previous example, the substrate utilized was an insulator. In the present example, a metallic substrate is utilized.

The apparatus employed may be that illustrated in FIGURE 1 and described in Example I. The steps of positioning the furnace tube 10 in a heater 13, and positioning a plurality of substrates 14 adjacent the outlet end 12 of furnace tube 10, are similar to those described above in connection with Example I. In this example, the substrate 14 consists of a plurality of metallic bodies. The bodies may consist of pure metals such as tungsten or molybdenum, or of alloys. In each case the substrates employed should have a melting point higher than the temperatures utilized in the process. Molybdenum is a suitable metallic substrate for this purpose.

Furnace tube 10 is purged with an inert gas as in Example I, and heater 13 is set to maintain temperatures of about 900° C. to 1100° C. The flow of inert gas is ended, and a mixture of hydrogen, vaporized niobium chloride, tin chloride, and a lattice defect inducing gas is passed through furnace tube 10 so that the mixture flows over the substrate 14. In this example, the lattice defect inducing gas consists of nitrogen, and its concentration in the mixed gas is about 0.3 to 9 volume percent.

As in the previous example, a high density visibly crystalline $Nb_3Sn$ coating 15 with a large number of crystal defects per unit volume is deposited on the substrates 14.

EXAMPLE IV

A high density crystalline superconductive $Nb_3Sn$ coating may be continuously deposited on an elongated flexible substrate such as a wire, tape, ribbon, or the like, by the embodiment next described. The coated filamentary flexible material thus fabricated may be utilized to form superconductive coils.

Figure 2:
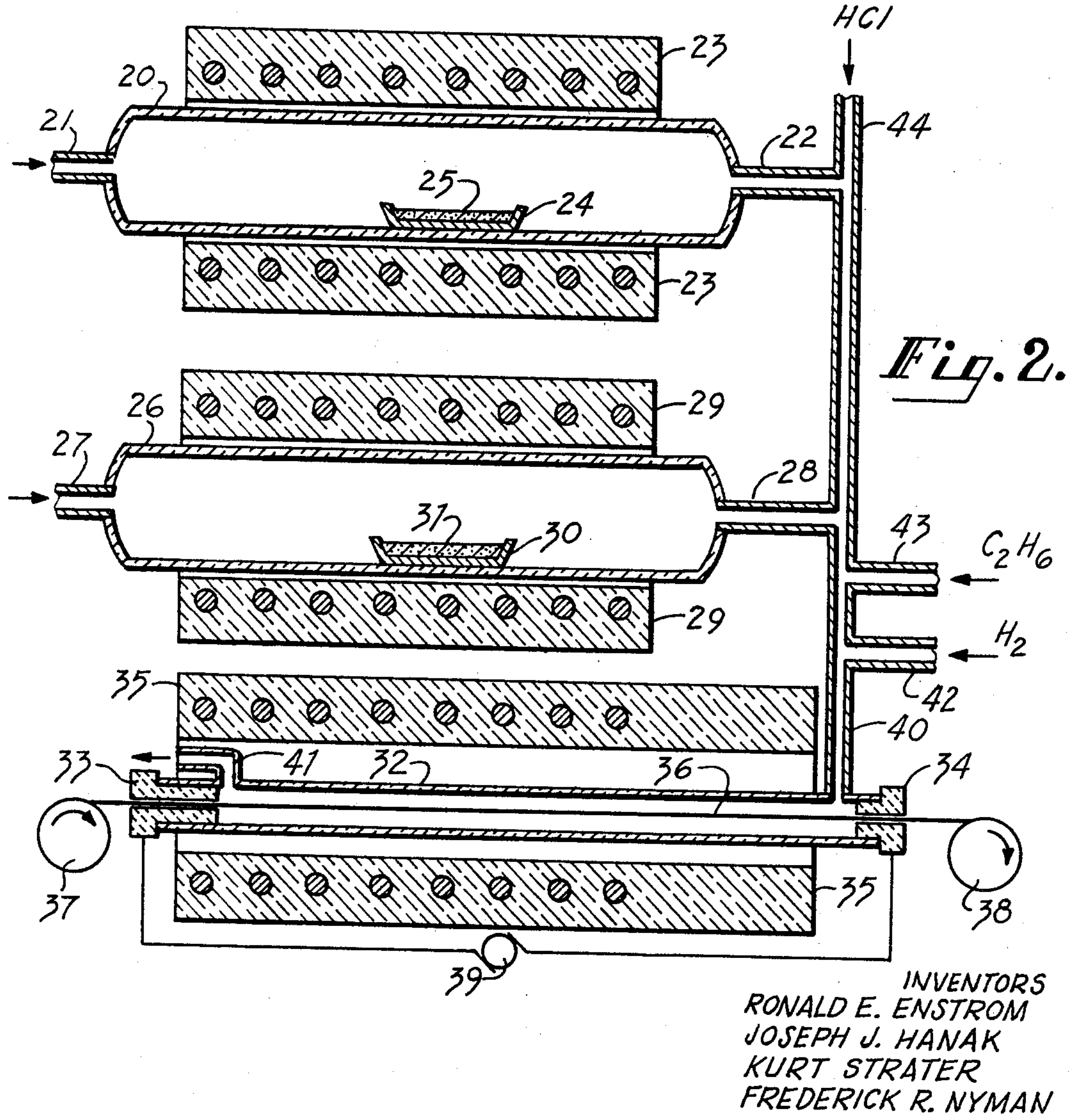
FIGURE 2 is a diagram of apparatus useful in another embodiment.

The apparatus employed in this example comprises a tin chlorinator, a niobium chlorinator, and a deposition chamber. The tin chlorinator is a refractory furnace tube 20 (FIGURE 2) having an inlet 21 at one end and an outlet 22 at the opposite end. The furnace tube 20 is surrounded by a first heater 23, such as an electrical resistance heater. A furnace boat 24 containing a charge 25 of finely granulated tin powder is positioned in furnace tube 20.

The niobium chlorinator comprises a furnace tube 26 having an inlet 27 at one end, and an outlet 28 at the other end. Furnace tube 26 is surrounded by a second heater 29. A furnace boat 30 containing a charge 31 of granulated niobium is positioned in furnace tube 26.

The deposition chamber 32 has an apertured carbon plug 33 at one end and another apertured carbon plug 34 at the opposite end, both of which provide constrictions at the ends of the chamber 32. The deposition chamber 32 is surrounded by a furnace heater 35. Suitably the flexible filamentary substrate utilized is metallic. In this example, the flexible substrate 36 to be coated is a stainless steel ribbon. The bare ribbon is unrolled from one spool 37, and the coated ribbon is rolled up on another spool 38. The metallic ribbon 36 enters the deposition chamber 32 through the graphite plug 33 at one end, and leaves through the other graphite plug 34 at the opposite end of the deposition chamber 32.

The ribbon 36 is drawn through the chamber 32 such that it makes contact with the carbon plugs 33 and 34. The plugs 33 and 34 serve as electrodes, and are connected to a source 39 of alternating current power to thereby pass an alternating electrical current through that portion only of the flexible substrate 36 which is within the deposition chamber 32, and thus heat this portion only of the substrate to the desired temperature. Suitably, the substrate 36 is thus heated to a temperature at least 50° C. above the temperature of the deposition chamber 32.

The deposition chamber 32 includes a feed or delivery tube 40 attached to one end thereof adjacent to the carbon plug 34; and an exhaust outlet 41 at the opposite end thereof adjacent to the other carbon plug 33. The delivery tube 40 has two inlets 42 and 43 near that end of the delivery tube adjacent to the deposition chamber 32, and has another inlet 44 at that end of the delivery tube remote from the deposition chamber 32. The outlet 22 of the tin chlorinator, and the outlet 28 of the niobium chlorinator, also feed into the delivery tube 40.

In operation, the apparatus is first purged by passing a stream of an inert gas such as helium or argon into inlets 21, 27, 42, 43 and 44. The inert gases pass through the entire apparatus and out through the exhaust 41. After the apparatus has been purged, the first heater 23 is set to maintain a temperature of about 800° C.; the second heater 29 is set to maintain a temperature of about 900° C.; and the third heater 35 is set to maintain a temperature of about 700° C. The flexible substrate 36 is passed through the deposition chamber 32 in the direction indicated by the arrows on spools 37 and 38. An alternating current is passed through the graphite plugs 33 and 34 so as to heat only that portion of the moving substrate 36 which is within the deposition chamber to a temperature at least 50° C. above the temperature of the deposition chamber 32.

The flow of the inert purging gas is now ended, and the reactive gases are passed into the apparatus. A stream of chlorine is passed into inlet 21 through the tin chlorinator 20. The chlorine reacts with the tin charge 25 present in the tube 20 according to the equation:

$$Sn + Cl_2 \rightarrow SnCl_2$$

The mixture of tin chloride vapors and unreacted chlorine gas is swept out of the tin chlorinator 20 through outlet 22 into the delivery tube 40.

A stream of chlorine gas is also passed into inlet 27 through the niobium chlorinator 26. The chlorine reacts with the niobium charge 31 present according to the equation:

$$Nb + 2Cl_2 \rightarrow NbCl_4$$

The mixture of niobium chloride vapors and unreacted chlorine is swept from the niobium chlorinator 26 via outlet 28 into the delivery tube 40.

At the same time, a stream of dry hydrogen chloride gas is passed into inlet 44, a stream of dry hydrogen is passed into inlet 42, and a small amount of a lattice defect inducing gas is passed into inlet 43. In this example, the lattice defect inducing gas is ethane, a hydrocarbon having a molecular weight greater than 16, and the flow of the various gases into the deposition chamber 32 is controlled so that the concentration of the hydrocarbon gas within the deposition chamber 32 is about 0.1 to 3 volume percent. When the hydrocarbon utilized is ethane, as in this example, a concentration of about 0.6 to 1.3 volume percent is particularly advantageous. Thus, a mixture consisting of niobium chloride vapors, tin chloride vapors, hydrogen, chlorine, and a lattice defect inducing gas (ethane in this example) is passed through the deposition chamber 32 and out via exhaust 41. In the chamber 32 the hydrogen reacts with the metallic chloride vapors in the vicinity of the heated substrate 36 according to the equation:

$$3NbCl_4 + SnCl_2 + 7H_2 \rightarrow Nb_3Sn + 14HCl$$

A coating of high density, lustrous, visibly crystalline niobium stannide $Nb_3Sn$ is thus deposited on the moving substrate 36.

The method of this embodiment may be varied by omitting the hydrogen chloride. Alternatively, the starting materials may consist of pure tin chloride, niobium chloride, and hydrogen, so that the chlorine may be omitted.

An important feature of this embodiment is that the crystalline $Nb_3Sn$ is deposited only on the flexible substrate 36, and is not deposited on the walls of the deposition chamber 32. If the $Nb_3Sn$ coating is permitted to deposit on the walls of the deposition chamber 32, the chamber and its passageway are eventually blocked. It then becomes necessary to halt the coating operation, and to clean the apparatus. The coating process thus becomes a discontinuous batch-type process. In contrast, in the embodiment described, the operation is a continuous flow process, and the coating operation proceeds steadily without interruption for any desired length of the elongated, flexible substrate.

Another feature of the invention is the improved nature of the $Nb_3Sn$ coating thus formed. The thickness of the coating may be varied, but is usually from 0.0001 to 0.001 inch thick. The coating deposited is visibly crystalline, non-porous, and has a metallic appearance and luster.

It has unexpectedly been found that the critical current $I_C$ at high magnetic fields for substrates coated as described is greater and more uniform than comparable materials of the prior art. It is thought that this increase in the critical current is due to the increase in the number of crystal lattice defects in the deposited crystalline niobium stannide coating. It is theorized that these defects in the lattice structure act as pinning sites for magnetic flux lines, and prevent the motion of the magnetic flux lines, thereby increasing the critical current of the material. Moreover, since all the niobium stannide thus deposited has a relatively large and uniform number of defects, the electrical characteristics of the material thus fabricated is more uniform than that of prior art material.

The lattice defects may be grain boundaries, and hence the concentration of lattice defects in the coating increases as the average grain size of the coating decreases. The coated ribbons prepared as described exhibited a variation in surface reflectivity which suggests a variation in the average grain size of the coating. The average grain size of the $Nb_3Sn$ coating according to this embodiment, as determined by X-ray diffraction line broadening, is about 350 to 800 Angstroms. The critical current of the material as measured in magnetic fields up to at least 80 kilogauss is a strong inverse function of grain size. For comparison, the prior art niobium tin coatings, made without any lattice-defect-inducing gas present, have an average grain size of over 1000 Angstroms.

In FIGURE 3, curve A is a plot showing the variation in current carrying capacity $J_C$ (in amperes per cm.$^2$) with external magnetic field (in kilogauss) for a flexible substrate coated with niobium stannide as described in Example IV. The defect inducing gas was ethane, $C_2H_6$, utilized in a concentration of about 0.6 volume percent. When other lattice-defect-inducing gases such as carbon dioxide are utilized, a very similar curve is obtained. For comparison, curve B is a similar plot for a comparable flexible substrate having a niobium stannide coating made in a similar manner, but without any defect inducing gas present. The superior current carrying capacity of the improved material is evident, even in a semilogarithmetic plot.

FIGURE 4 is a plot showing the variation in critical current $I_C$ in amperes for superconducting material according to this embodiment in a 40 kilogauss magnetic field versus the number of grain boundaries per unit length, the latter being equivalent to the inverse of the average grain size.

Other forms of apparatus may be utilized, and other defect inducing gases may be employed, such as branched-chain hydrocarbons and unsaturated hydrocarbons. The preferred concentration ranges vary for different defect inducing gases, but the operative concentrations for each gas may be readily determined by measuring the improvement in the critical current. Tracer studies indicate that some of the defect inducing gas is physically incorporated in the niobium tin coating, thus causing the crystal lattice defects therein. Various other modifications may be made by those skilled in the art without departing from the spirit and scope of the invention as set forth in the specification and the appended claims.

What is claimed is:

1. The method of depositing a coating of crystalline niobium tin on a substrate, comprising the steps of:

heating said substate in a gaseous ambient of hydrogen, niobium chloride vapor, tin chloride vapor, and a lattice-defect-inducing gas to reduce a portion of said chlorides and deposit the metallic fractions thereof on said substrate as crystalline niobium tin.

2. The method of depositing a coating of crystalline niobium tin on a substrate as in claim 1, wherein said ambient includes hydrogen chloride, and said coating has an average grain size of about 350 to 800 Angstroms.

3. The method of depositing a coating of crystalline niobium tin on a stubstrate as in claim 1, wherein said substrate is either insulating or semiconductive or metallic.

4. The method of depositing a coating of crystalline niobium tin on an insulating substrate as in claim 1, wherein said gas capable of inducing lattice defects is an amount of carbon monoxide, carbon dioxide, nitrogen, or a hydrocarbon gas having a molecular weight greater than 16 sufficient to produce a large number of crystal lattice defects per unit volume in the niobium tin deposited on said substate.

5. The method of depositing a coating of crystalline niobium tin on a substrate as in claim 1, wherein the amount of said lattice-defect-inducing gas employed is operative to increase the critical current of said niobium tin coating.

6. The method of depositing a coating of crystalline niobium tin on a flexible filamentary substrate, comprising the steps of:

continuously passing said flexible substrate through a reaction chamber;

passing a mixture of hydrogen, niobium chloride vapor, tin chloride vapor, and a lattice-defect-inducing gas into said reaction chamber; and, heating said substrate in said reaction chamber to a temperature sufficient to reduce a portion of said chlorides and deposit the metallic fraction thereof on said substrate as a coating of crystalline niobium tin.

7. The method of depositing a coating of crystalline niobium tin on a flexible filamentary substrate as in claim 6, wherein said substrate is metallic.

8. The method of depositing a coating of crystalline niobium tin on an elongated flexible metallic substrate as in claim 6, wherein said mixture includes hydrogen chloride.

9. The method of depositing a coating of crystalline niobium tin on an elongated flexible metallic substrate as in claim 6, wherein said defect inducing gas is selected from the group consisting of carbon monoxide, carbon dioxide, nitrogen, or hydrocarbons having a molecular weight greater than 16.

References Cited

UNITED STATES PATENTS 3,268,362 8/1966 Hanak et al. ---- 117—107.2 X
3,293,076 12/1966 Allen et al. ------- 117—107 X ALFRED L. LEAVITT, *Primary Examiner.*

A. GOLIAN, *Assistant Examiner.*